United States Patent [19]
College

[11] Patent Number: 5,924,200
[45] Date of Patent: Jul. 20, 1999

[54] UNIVERSAL STRIPPING BLADE FOR WIRES

[75] Inventor: David Alan College, Annville, Pa.

[73] Assignee: The Whitaker Corporation, Wilmington, Del.

[21] Appl. No.: 08/925,541

[22] Filed: Sep. 8, 1997

Related U.S. Application Data

[60] Provisional application No. 60/026,776, Sep. 23, 1996.

[51] Int. Cl.⁶ .................................................. H02G 1/12
[52] U.S. Cl. ............................................. 30/90.1; 81/9.51
[58] Field of Search .................. 30/90.1, 241, 91.2, 30/351; 81/9.51; 83/693, 13

[56] References Cited

U.S. PATENT DOCUMENTS

| | | | |
|---|---|---|---|
| 649,039 | 5/1900 | Bernard | 30/91.2 |
| 1,814,589 | 7/1931 | Endsley | 30/91.2 |
| 2,036,463 | 4/1936 | Deaver | 30/91.2 |
| 3,151,510 | 10/1964 | Bunker et al. | 30/91.2 |
| 3,530,575 | 9/1970 | Riche | 30/91.2 |
| 4,577,405 | 3/1986 | Butler | 30/90.1 |
| 4,852,433 | 8/1989 | Butler | 30/90.1 |
| 4,972,582 | 11/1990 | Butler | 30/90.1 |
| 5,414,931 | 5/1995 | Wollermann | 30/90.1 |

FOREIGN PATENT DOCUMENTS

| | | | |
|---|---|---|---|
| 964667 | 7/1964 | United Kingdom | 30/91.2 |

OTHER PUBLICATIONS

European Search Report, International application No. PCT/US 97/16805, International filing date Sep. 23, 1997.

*Primary Examiner*—Hwei-Siu Payer

[57] ABSTRACT

A wire cutting and stripping blade (50) having a pair of opposing arcuate cutting edges (54, 55, 56) is arranged to function in an apparatus, such as a lead making machine, for cutting a wire (59) to length and stripping a portion of the insulation (59a) from its ends. The two arcuate cutting edges (54, 55, 56) are arranged on opposite sides of a longitudinal axis (x) of the wire cutting and stripping blade (50). Each of the arcuate cutting edges is composed of two concave segments (55, 56) and a convex segment (54), which form a single smooth cutting edge. The concave segments (56) closest to the longitudinal axis (x) are joined at a radiused vertex (57). The convex portions diverge away from the longitudinal axis in a direction away from the vertex (57) and form a lead-in for guiding and initially cutting the insulation of the wire.

8 Claims, 5 Drawing Sheets

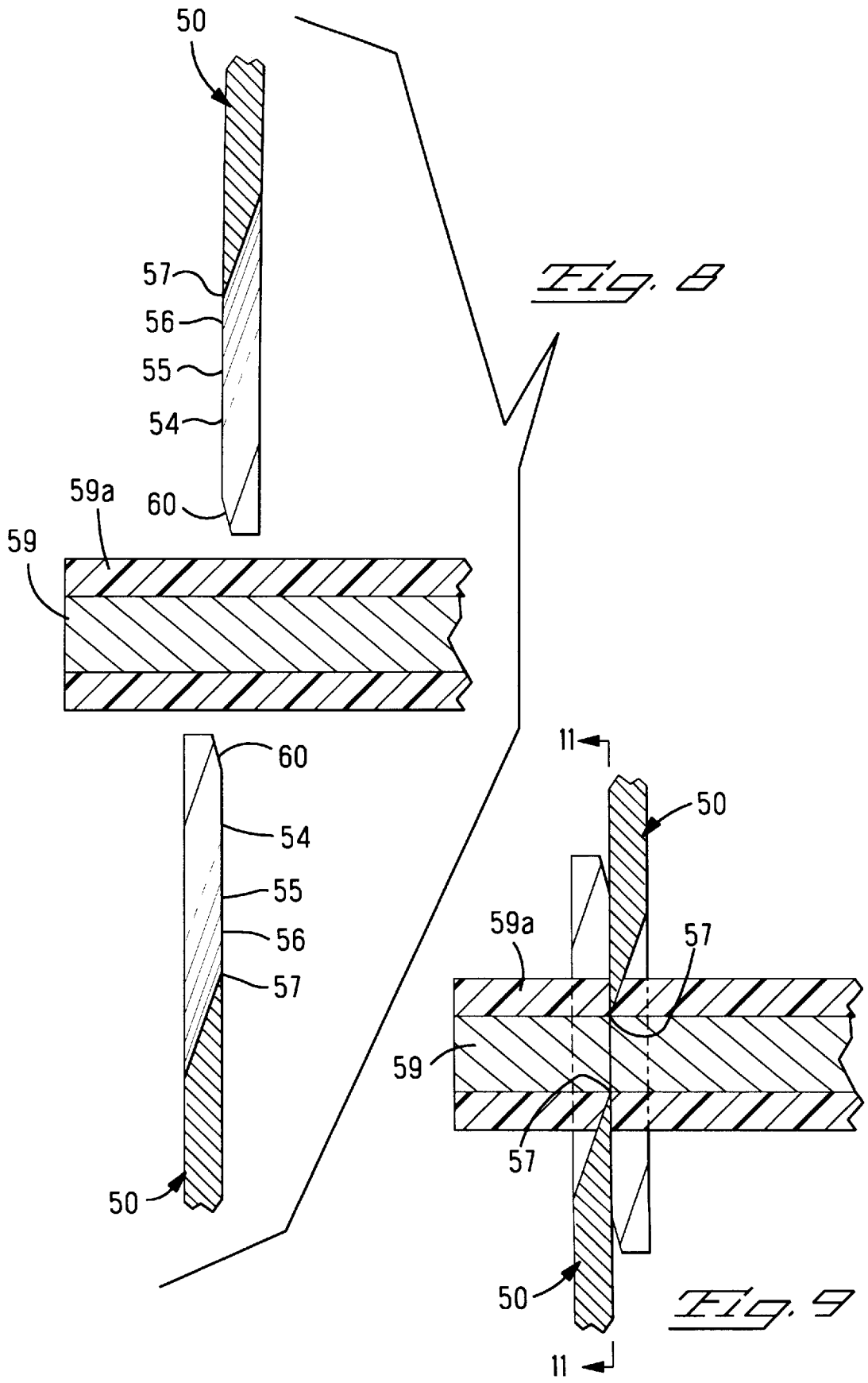

UNIVERSAL STRIPPING BLADE FOR WIRES

This application claims benefit of provisional application No. 60/026,776 filed Sep. 23, 1996.

The present invention relates to a blade for stripping insulation from electrical conductors in a wire stripping operation; and, more particularly, to a blade comprising arcuate cutting edges for minimizing the total area of uncut insulation around the conductors.

BACKGROUND OF THE INVENTION

Prior art FIGS. 1, 3, and 4 show a known stripping blade 10, FIG. 3 being an enlarged view of a portion of the blade shown in FIG. 1. Blade 10 includes: a body of tool quality steel 11; a cutting opening 12 comprising a sharpened blade section; and a tooling attachment section 18 for connecting blade 10 to a stripping machine. Cutting opening 12 includes: first and second cutting edges 14,15 formed along a compound angle 13. Compound angle 13 extends across the thickness of body 11. As is best shown in FIGS. 3 and 4, second cutting edges 15 converge to a vertex 16. Cutting edges 14 and 15 include a respective angle of convergence A,B with angle A being less than angle B, as is shown in FIG. 3. When two blades 10 are brought together in a conventional wire stripping operation, as shown in FIG. 4, a conductor 19 is disposed in the cutting openings for the purpose of stripping the conductor, preferably, without nicking the conductor during the stripping operation. Conductor 19 includes insulation 19a therearound, but, as the blades 10 are brought together, four areas of insulation 19b,19c remain uncut by blades 10. Such uncut areas 19b,19c are undesirable because, as the stripping blades move the slug of insulation away from the insulation which is to remain, slivers of insulation may extend along the sides of conductor 19. These slivers of insulation create manufacturing problems as they are likely to become lodged in a crimp barrel of a terminal during a crimping process, thereby compromising the quality of the crimp. Moreover, if the conductor is to be soldered rather than crimped, the slivers of insulation will negatively effect the quality of the solder joint. Further, because the total area of insulation to be cut increases with increasing wire size, the likelihood of the appearance of uncut insulation slivers increases proportionately with increasing wire size.

Prior art FIGS. 2 and 5 show a V-type blade 20 for stripping wires. Blade 20 includes: a body of tool quality steel 21; a cutting opening 22 comprising a sharpened blade section; and a tooling attachment section 28 for connecting blade 20 to a stripping machine. Cutting edges 24 extend along a compound angle 23, and converge to a vertex 26. When two blades 20 are brought together in a conventional stripping operation to strip a conductor 29 having insulation 29a, four areas of uncut insulation 29b,29c remain around conductor 29 Such uncut areas of insulation are likewise disadvantageous for the reasons given above in respect of stripping blade 10.

To overcome the foregoing problems, the present invention provides a universal wire stripping blade for stripping a range of wire sizes. The universal stripping blade of the present invention reduces the total area of uncut insulation and substantially eliminates two areas of uncut insulation when stripping relatively large size wires, and otherwise reduces the overall area of uncut insulation during the stripping of relatively smaller gauge wires.

BRIEF DESCRIPTION OF THE DRAWINGS

FIGS. 8 and 9 are cross-sectional views showing a pair of blades, similar to the blade of FIG. 7, in different operating positions.

DESCRIPTION OF THE INVENTION

Figure 1:
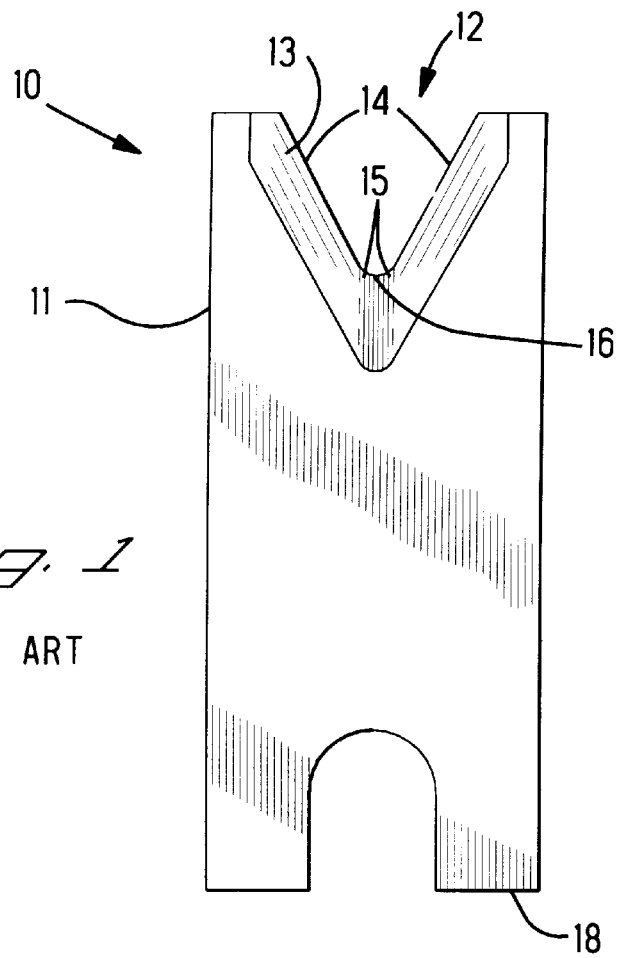
FIG. 1 shows a wire stripping blade according to a first prior art device.
Figure 2:
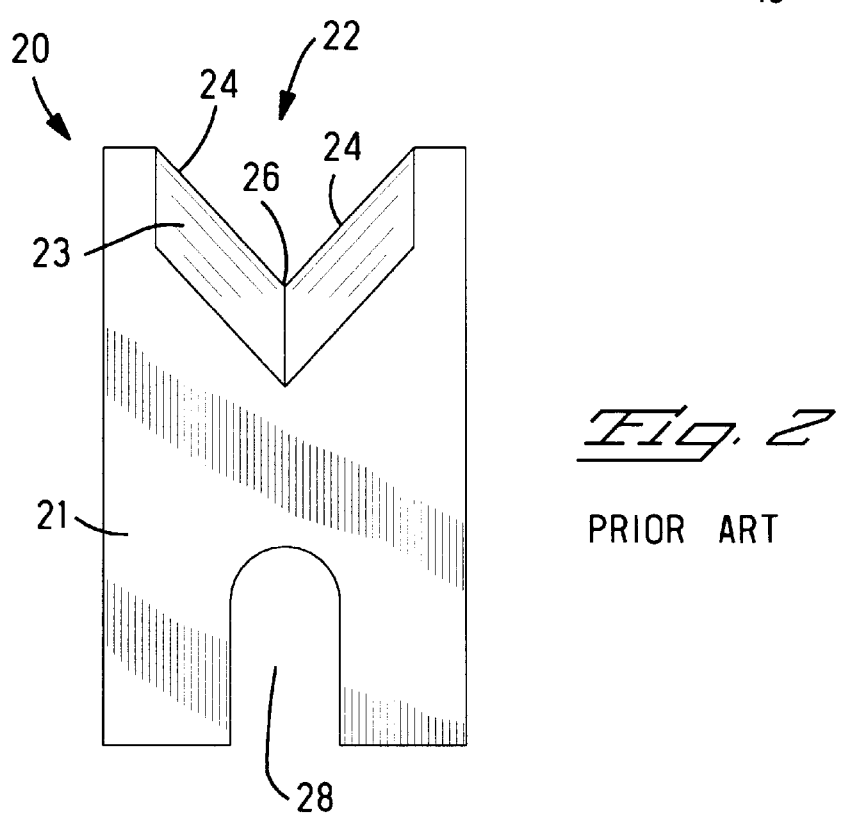
FIG. 2 shows a wire stripping blade according to a second prior art device.
Figure 4:
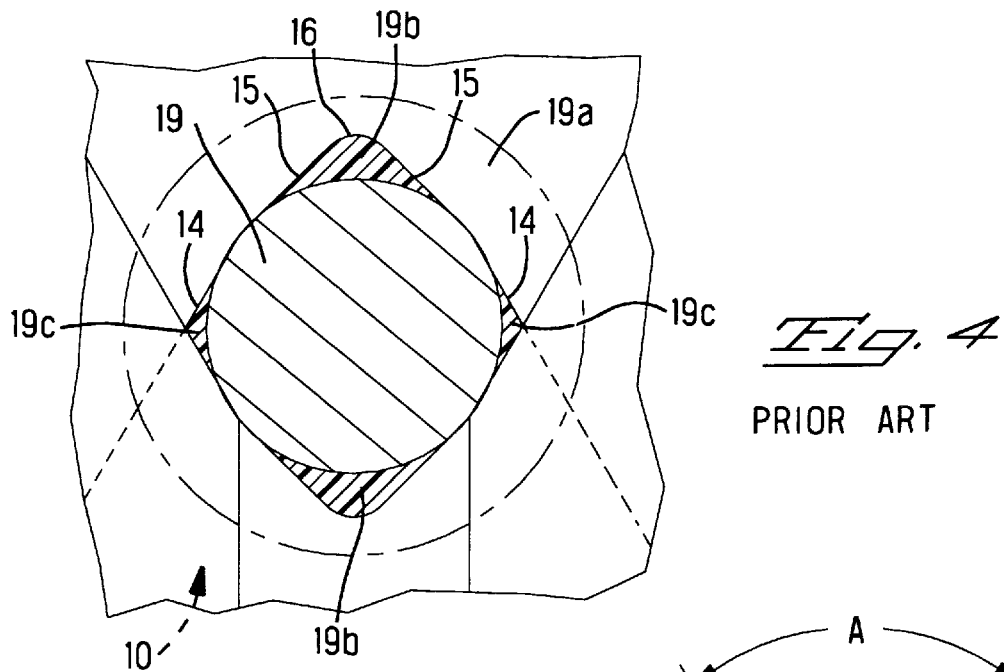
FIG. 4 shows a pair of blades according to the device of FIGS. 1 and 3 when cutting the insulation of a conductor.
Figure 3:
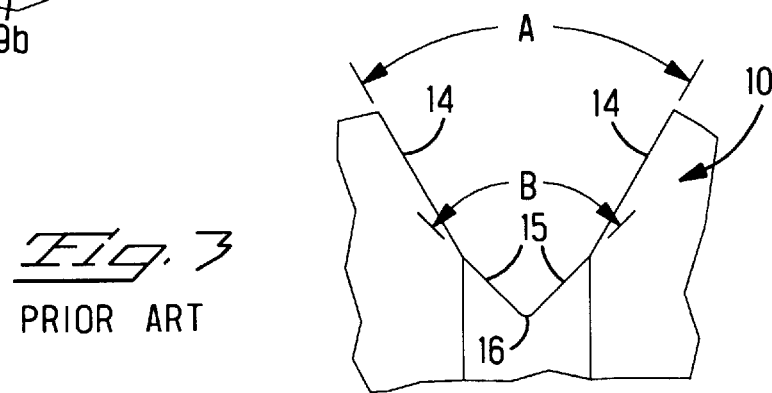
FIG. 3 shows a close up view of the blade of FIG. 1.
Figure 5:
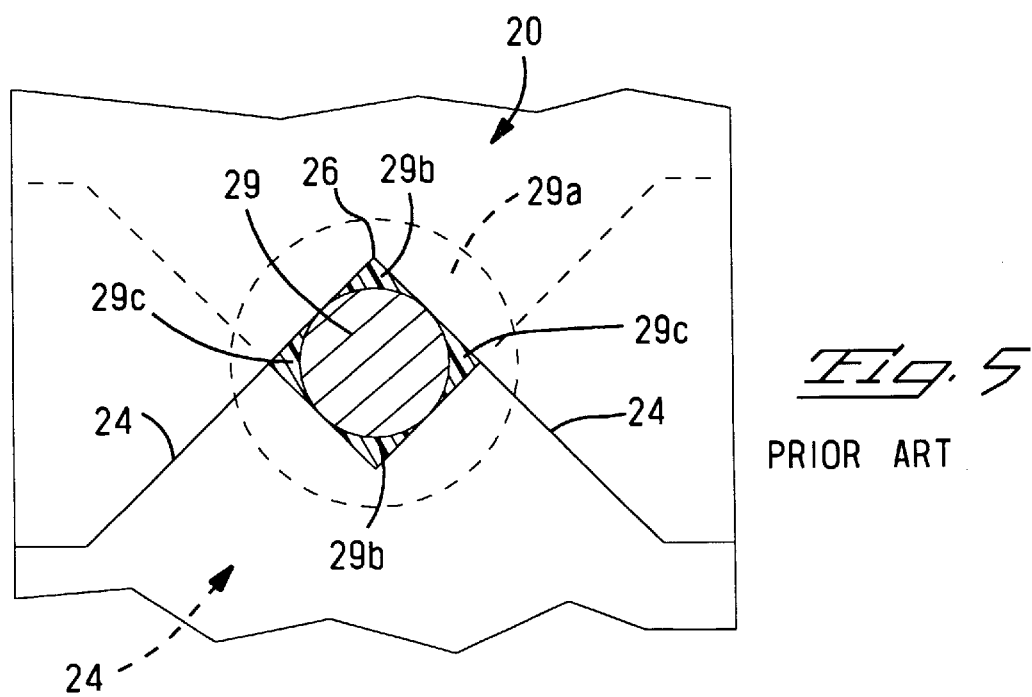
FIG. 5 shows a pair of blades according to the device of FIG. 2 when cutting the insulation of a conductor.
Figures 6, 7:
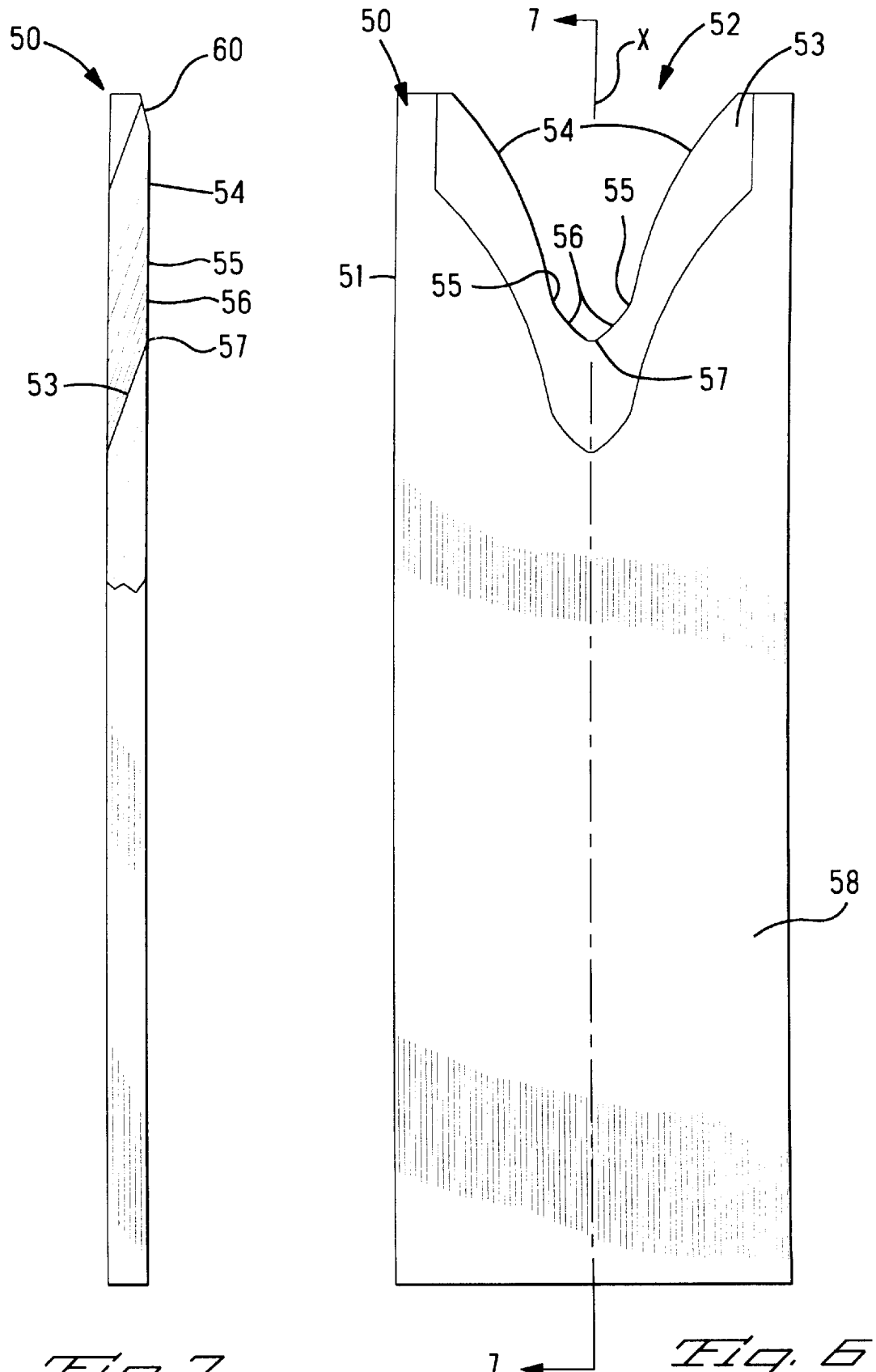
FIG. 6 is a plan view of a wire stripping blade in accordance with the present invention.
FIG. 7 is a partial cutaway side view along line 7—7 of the blade shown in FIG. 6.

FIG. 6 shows a wire stripping blade 50 according to the present invention having: an axis of symmetry X; a body 51 formed of tool quality steel; a cutting opening 52; and a tool attachment section 58. Cutting opening 52 comprises: a first set of cutting edges 54; a second set of cutting edges 55; a third set of cutting edges 56; and a vertex 57. Edges 54,55,56 are generally symmetrically disposed in opening 52 relative to axis X. A compound angle 53, as best shown in FIG. 6, extends across a thickness of body 51 and acts as a lead-in to guide wires toward cutting edges 54,55,56. A lead-in taper 60 is formed adjacent opening 52, as best shown in FIG. 7. Taper 60 prevents stubbing of a set of blades 50 as they are being moved towards each other in a cutting stroke of a conventional stripping operation wherein the axes of the blades are arranged perpendicular to the wire 59, as shown in FIGS. 8–9.

During the cutting stroke, blades 50 contact insulation 59a of a conductor 59, as follows: cutting edges 54 are lead-in edges and cut the insulation first, followed secondly by cutting edges 55, thirdly by cutting edges 56, and finally by vertices 57, that further cut the insulation. Conductor 59, for example, is a relatively large size wire, e.g. 10 AWG. The fully advanced cutting stroke position is shown in FIG. 9.

Figure 10:
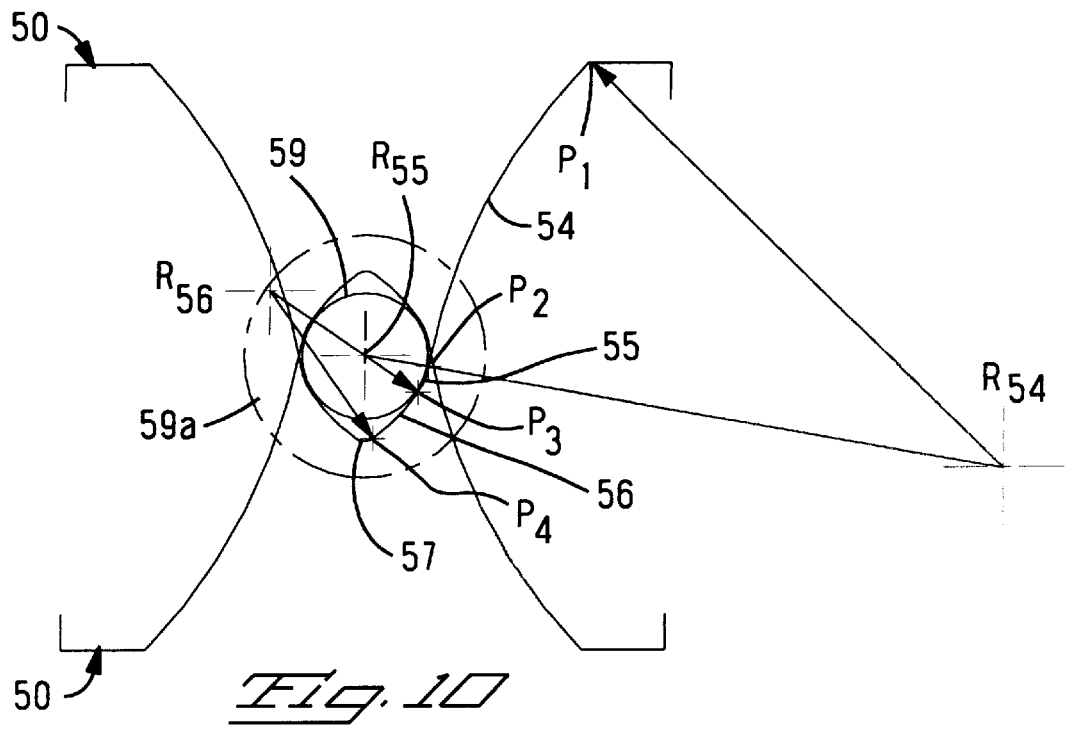
FIG. 10 shows the detail geometry of the cutting edge of the blade shown in FIG. 6.

Referring to a preferred embodiment of the invention which is depicted in FIG. 10, a pair of substantially identical blades 50 will be described in further detail. To avoid confusion, one side of cutting opening 52 will be described with the understanding, with reference to FIG. 10, that each blade 50 includes two such sides generally symmetrically disposed about axis X.

Cutting edges 54,55,56 define a series of distinct, sharp edges in opening 52. The edges are delimited by a series of transition points $P_1$–$P_4$, such that: first cutting edge 54 is between points $P_1,P_2$; second cutting edge 55 is between points $P_2,P_3$; and third cutting edge 56 is between points $P_3,P_4$. Edge 56 blends in with vertex 57 at transition point $P_4$. Each edge 54,55,56 is preferably shaped to define an arcuate profile, for example, a semi-circular profile having a radius with constant curvature about a respective radius point $R_{54},R_{55},R_{56}$. Radius points $R_{54},R_{55},R_{56}$ are advantageously placed in predetermined locations relative to axis X, for the purpose of forming the arcuate profiles, as follows: radius point $R_{54}$ is located on the same side of axis X as edge 54; radius point $R_{55}$ is generally centered on axis X; and radius point $R_{56}$ is located on an opposing side of axis X relative to edge 56. Respective edges 54 of a blade 50 thereby define lead-in cutting edges, and edges 55 and 56 define cutting edges which cut close to the conductor and yet conform to the circumference of the conductor 59 without nicking the same. Moreover, cutting edges 55,56 advantageously eliminate areas of insulation which were left uncut in prior cutting blades.

In an example of the present invention, the respective radius dimensions of edges 54,55,56, in inches, were formed as follows: $R_1$ at about 0.6; $R_2$ at about 0.07; and $R_3$ at about 0.19. However, although the preferred embodiment of the present invention provides for semi-circular edges 54,55,56, it is contemplated that non-semicircular arcuate profiles, i.e. having a non-constant curvature about a point, can be used to define the three cutting edges as well. For example, profiles comprising a parabolic, elliptical, or other non-semi-circular arc can be used in accordance with the scope of the present invention. Use of linear edges in combination with arcuate profiles is also contemplated.

Figure 11:
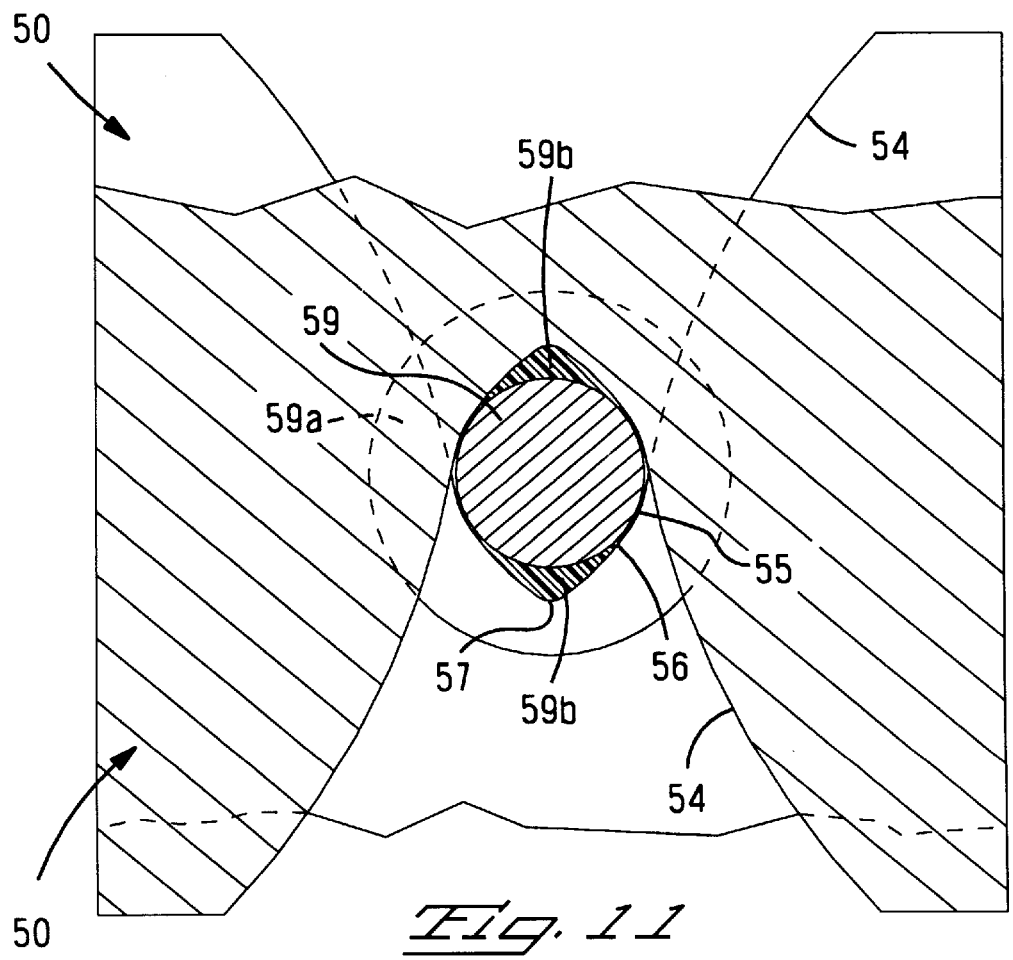
FIG. 11 illustrates the extent to which insulation is penetrated by the blade shown in FIG. 6.

FIG. 11 is a partial cross sectional view of the blades 50 and conductor 59 as shown in FIG. 9. In an important advantage of the inventions the arcuate profiles of edges 54,55,56 have cut all but two sections 59*b* of insulation 59*a*. This is advantageous because the total uncut insulation area of relatively large conductor 59 has been minimized. Moreover, edges 54,55,56 render blades 50 operative as universal cutting blades suitable for functioning in an apparatus, such as a wire cutting and stripping tool or a wire lead making machine, for stripping a range of sizes of conductors 59, for example, AWG sizes 10–26.

Thus, while a preferred embodiment of the present invention has been disclosed, it is to be understood that the invention is not to be strictly limited to such embodiment but may be otherwise variously embodied and practiced within the scope of the appended claims.

I claim:

1. A cutting blade for use in an apparatus for cutting a portion of insulation from an end of an insulated conductor, said cutting blade comprising:
   (1) a body having a cutting opening and a longitudinal axis extending through said body and said cutting opening;
   (2) first right and first left arcuate cutting edges formed in said body on opposite right and left sides, respectively, of said longitudinal axis beginning at said longitudinal axis and diverging toward an end of said body so that said first right and left arcuate cutting edges define a portion of said cutting opening; and
   (3) second right and second left arcuate cutting edges on said right and left sides, respectively, arranged between said end of said body and said first right and first left arcuate cutting edges so that said first and second right arcuate cutting edges are delimited by a first common point and said first and second left arcuate cutting edges are delimited by a second common point.

2. The cutting blade according to claim 1 including a vertex formed at a convergence of said first right and left arcuate cutting edges, said vertex having a cutting edge that joins and blends into said first right and left arcuate cutting edges thereby forming a single continuous cutting edge.

3. The cutting blade according to claim 2 wherein said cutting edge of said vertex has a shape to closely conform to said conductor without nicking said conductor during said cutting.

4. The cutting blade according to claim 2 wherein said first right and left arcuate cutting edges are concave toward said longitudinal axis.

5. The cutting blade according to claim 4 wherein said second right and left arcuate cutting edges are concave toward said longitudinal axis.

6. The cutting blade according to claim 5 including third right and left arcuate cutting edges on said right and left sides, respectively, and arranged between said end of said body and said second right and left arcuate cutting edges so that said second and third right cutting edges are delimited by a third common point and said second and third left cutting edges are delimited by a fourth common point, wherein said first, second, and third right arcuate cutting edges form a continuous right cutting edge and said first, second, and third left arcuate cutting edges form a continuous left cutting edge.

7. The cutting blade according to claim 6 wherein said third right and left arcuate cutting edges are convex toward said longitudinal axis.

8. The cutting blade according to claim 7 wherein said continuous right cutting edge and said continuous left cutting edge are symmetrical with respect to said longitudinal axis.

* * * * *